(12) United States Patent
Chu et al.

(10) Patent No.: US 10,827,428 B1
(45) Date of Patent: Nov. 3, 2020

(54) SYSTEMS AND METHODS FOR MANAGING BASIC SERVICE SETS THROUGH WAKEUP FRAMES IN A LOW POWER WIRELESS NETWORK

(71) Applicant: Marvell International Ltd., Hamilton (BM)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 139 days.

(21) Appl. No.: 15/986,073

(22) Filed: May 22, 2018

Related U.S. Application Data (60) Provisional application No. 62/510,128, filed on May 23, 2017.

(51) Int. Cl.
*H04W 52/02* (2009.01)
*H04L 29/12* (2006.01)
*G06F 1/3209* (2019.01)
*H04L 12/12* (2006.01)
*H04W 84/12* (2009.01)

(52) U.S. Cl.
CPC ...... *H04W 52/0229* (2013.01); *G06F 1/3209* (2013.01); *H04L 12/12* (2013.01); *H04L 61/3015* (2013.01); *H04W 84/12* (2013.01)

(58) Field of Classification Search
None
See application file for complete search history.

(56) References Cited

U.S. PATENT DOCUMENTS

2016/0353382 A1* 12/2016 Xue ................. H04W 52/0251
2018/0027490 A1* 1/2018 Liu ....................... H04W 76/16
370/311
2018/0242249 A1* 8/2018 Yang ................... H04W 52/028

* cited by examiner

*Primary Examiner* — Jutai Kao (57) ABSTRACT

Embodiments described herein provide a mechanism including the configuration and use of the wakeup request (WUR) frame to announce the transmission of a management frame. Specifically, the WUR frame is configured with information indicating whether the incoming management frame includes new BSS operation information, based on which the low power device may determine whether to wake up the 802.11 WLAN receiver to receive the management frame.

20 Claims, 7 Drawing Sheets

SYSTEMS AND METHODS FOR MANAGING BASIC SERVICE SETS THROUGH WAKEUP FRAMES IN A LOW POWER WIRELESS NETWORK

CROSS-REFERENCE TO RELATED APPLICATION

This disclosure claims the benefit under 35 U.S.C. § 119(e) of U.S. Provisional Patent Application No. 62/510,128, filed on May 23, 2017, which is hereby expressly incorporated by reference herein in its entirety.

This application is related to commonly-assigned and co-pending U.S. nonprovisional application Ser. No. 15/969,429, filed on May 2, 2018, which is hereby expressly incorporated by reference herein in its entirety.

FIELD OF USE

This disclosure relates to managing lower power (LP) devices in a wireless communication system, and specifically, to managing basic service sets (BSS) through wakeup frames in a low power wireless network.

BACKGROUND OF THE DISCLOSURES

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In existing 802.11 wireless local area networks (WLANs), a service set is defined as a group of wireless network devices that are operating with the same networking parameters. The service sets are arranged hierarchically. Basic service sets (BSS) are defined as units of devices operating with the same medium access characteristics (i.e. radio frequency, modulation scheme, etc.). Sometimes, management frames are transmitted from a wireless access point (AP) to a wireless device to announce new BSS operation parameters. Such management frames usually include a channel switch announcement, an operation mode notification, a beacon, a probe response, etc. When the wireless device is a low power device, which may transit into a sleep mode by turning off the 802.11 Wi-Fi receiver module to save power, the low power device sometimes needs to wake up to receive such management frames. Existing systems and transmission protocols lack a mechanism for the low power devices to ascertain whether to wake up the Wi-Fi receiver to receive and decode an incoming management frame.

SUMMARY

Embodiments described herein provide a method for a method for transmitting a wake-up request frame to low power devices to announce a management frame of basic service set (BSS) information in a wireless local area network. At a wireless access point, data may be received, including BSS operation information for transmission in a management frame to one or more lower power wireless devices. The wireless access point may determine whether the BSS operation information includes an update. In response to determining that the BSS operation information includes an update, generating, the wireless access point may generate a wake-up request frame containing at least one field indicative of the BSS operation information update, and transmit the wake-up request frame to the one or more lower power wireless devices to turn on respective one or more wireless receivers at the one or more low power wireless devices prior to transmitting the BSS operation information in a management frame to the one or more lower power wireless devices.

In some implementations, the wireless access point may configure a BSS operation information token field within the wake-up request frame. The wireless access point may then assign a token value of zero to the BSS operation information token field when a new BSS is formed, and assign a token value corresponding to a previously used token value incremented by one to the BSS operation information token field when the BSS operation information is to update an existing BSS.

In some implementations, the wireless access point may configure a type field within the wake-up request frame, and assign a type value defined to indicate a BSS start or a BSS recovery to the type field.

In some implementations, the wireless access point may determine whether a type of the management frame corresponds to a beacon frame. In response to determining that the management frame corresponds to the type of the beacon frame, the wireless access point may configure the wake-up request frame with an association identifier field, and assign a value corresponding to a partial medium access control address of the wireless access point to the association identifier field.

In some implementations, the wireless access point may determine that a connection, relating to the BSS operation information, between the wireless access point with a low power device is interrupted, and may then monitor a condition for the connection for a recovery. In response to detecting the recovery for the connection relating to the BSS operation information, the wireless access point may transmit the configured wake-up request frame with the association identifier field and subsequently transmit the beacon frame to the low power device. The low power device determines whether to receive and decode the beacon frame based on comparing the association identifier field with a previously stored medium access control address of an associated access point.

In some implementations, the low power device is configured to receive and decode the beacon frame when the low power device is not previously associated with any wireless access point.

In some implementations, in response to determining that the management frame corresponds to the type of the beacon frame, the wireless access point may configure the wake-up request frame with a medium access control address field, and assign a value corresponding to a full medium access control address of the wireless access point to the medium access control address field.

In some implementations, the wireless access point may determine whether the management frame corresponds to a type of a broadcast public action frame. In response to determining that the management frame corresponds to the type of the broadcast public action frame, the wireless access point may configure the wake-up request frame with a BSS identifier field, and assign a pre-defined value indicating the management frame following the wake-up request frame corresponds to the broadcast public action frame to the BSS identifier field.

In some implementations, the wireless access point may determine whether the management frame corresponds to a type of a unicast public action frame. In response to determining that the management frame corresponds to the type of the unicast public action frame, the wireless access point may configure the wake-up request frame with an association identifier field. The wireless access point may assign a first bit of the association identifier field to a value indicating a type of a partial medium access control address bits, and assign remaining bits of the association identifier the partial medium access control address bits based on the type indicated by the first bit of the association identifier.

In some implementations, the wireless access point may determine whether the management frame corresponds to a type of a broadcast frame. In response to determining that the management frame corresponds to the type of the broadcast frame, the wireless access point may determine whether each virtual access point associated with the wireless access point has a different BSS identifier. In response to determining that each virtual access point associated with the wireless access point has a different BSS identifier, the wireless access point may configure the wake-up request frame without any association identifier field, and assign the different BSS identifier to a BSS identifier field in the wake-up request frame to identify a respective virtual access point. In response to determining that not all virtual access points associated with the wireless access point have different BSS identifiers, the wireless access point may configure the wake-up request frame with an association identifier field, and may assign a specific value indicative of one or more virtual access points to the association identifier field to identify the respective one or more virtual access points.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for managing basic service sets (BSS) through wakeup frames in a low power wireless network.

In a WLAN environment, an LP device may constantly turn off its Wi-Fi module to save power when the LP device is not in use. A LP wake-up receiver is used as a companion radio receiver with an 802.11 WLAN receiver, which is used to serve as a WUR signal receiver, while the 802.11 WLAN receiver is used to receive payload user data after the WUR signal is received. For example, management frames are usually considered as payload user data, but for different types of management frames, the low power device may or may not need to be waken up, because various management frames may be received and treated differently by the low power devices. For example, when a broadcast management frame is not used for announcing new BSS operation parameters, the user device usually does not need to decode the management frame, and thus a low power device does not need to wake up for receiving the management frame. However, when the frames include a beacon, a probe response etc., a low power device needs to wake up to receive such management frames even if these frames do not announce any new BSS operation parameter. Some management frames are transmitted for inter-BSS communication. For example, for a unicast public action with a destination that is outside the BSS of the transmitter, the corresponding management frame does not include any association identifier (AID). Existing systems and transmission protocols lack a mechanism for the low power devices to ascertain whether to wake up the Wi-Fi receiver to receive and decode an incoming management frame.

Embodiments described herein provide a mechanism including the configuration and use of the wakeup request (WUR) frame to announce the transmission of a management frame. Specifically, the WUR frame is configured with information indicating whether the incoming management frame includes new BSS operation information, based on which the low power device may determine whether to wake up the 802.11 WLAN receiver to receive the management frame.

Figure 1:
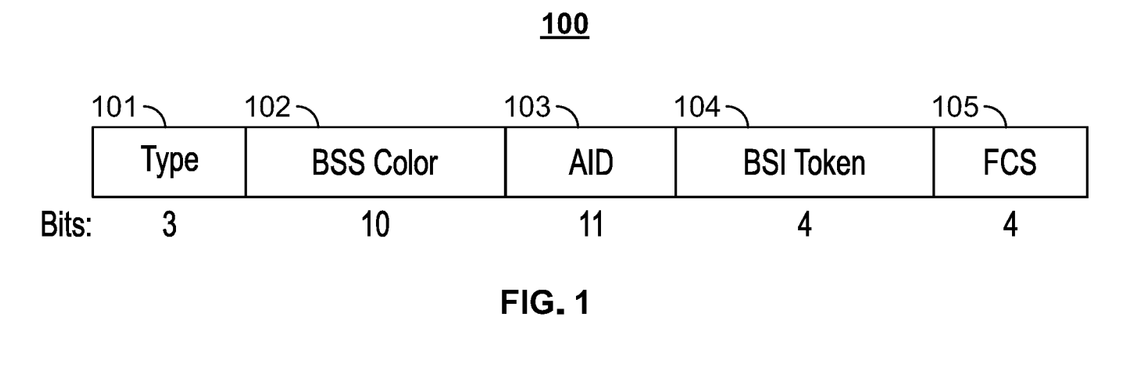
FIG. 1 is a block diagram illustrating an example WUR data frame containing BSS coloring information, according to some embodiments described herein.

FIG. 1 is a block diagram 100 illustrating an example WUR data frame containing BSS coloring information, according to some embodiments described herein. In 802.11 WLANs, a service set is defined as a group of wireless network devices that are operating with the same networking parameters. The service sets are arranged hierarchically, basic service sets (BSS) are defined as units of devices operating with the same medium access characteristics (i.e. radio frequency, modulation scheme etc.). To increase capacity in a dense environment (e.g., a large number of user devices), frequency reuse between BSS's is usually increased. However, devices from one BSS can often defer to another BSS that share the same channel with the first BSS, with no increase in network capacity. Thus, 802.11ax adopts a method known as BSS coloring for addressing medium contention overhead due to the overlapping basic service set (OBSS) and spatial reuse. 802.11ax radios can differentiate between BSSs by adding a number (e.g., the "color") to the PHY header of each packet to identify a respective BSS associated with a device. New channel access behavior can then be assigned based on the color detected from the PHY header of the packet.

Similarly, the WUR frame can be designed based on BSS/AP identifier BSS color, e.g., the respective BSS that the intended LP device belongs to. As shown at diagram 100, the example WUR frame may include a three-bit type filed 101 specifying the type of the frame (e.g., a WUR frame), a 10-bit BSS color 102 that indicates the BSS the intended LP device belongs to, a 11-bit station identifier, e.g. association identifier (AID) 103 that identifies the intended LP device, a four-bit BSS Operation Information (BSI) token field 104, and a four-bit frame check sequence (FCS) field 105. When an access point (AP) sends the WUR frame 100 to an intended LP device, the AP may configure the AP's identifier in the BSS color field 102, which is long enough to avoid color collision. The 12-bit BSS color field 102 may be different from the BSS color used in a payload data frame under 802.11ax, since the 802.11ax BSS color field is shorter than 12 bits. The use of the BSI token 104 is further described in relation to FIG. 2. The four-bit (or greater than four bit) FCS field 105 can be used as cyclic redundancy check to detect the transmission error. Further detail of WUR configuration of a WUR frame similar to 100 is discussed in commonly-assigned and co-pending U.S. Non-provisional application no. 62/510,128, filed May 2, 2018, which is hereby expressly incorporated herein by reference in its entirety.

Figure 2:
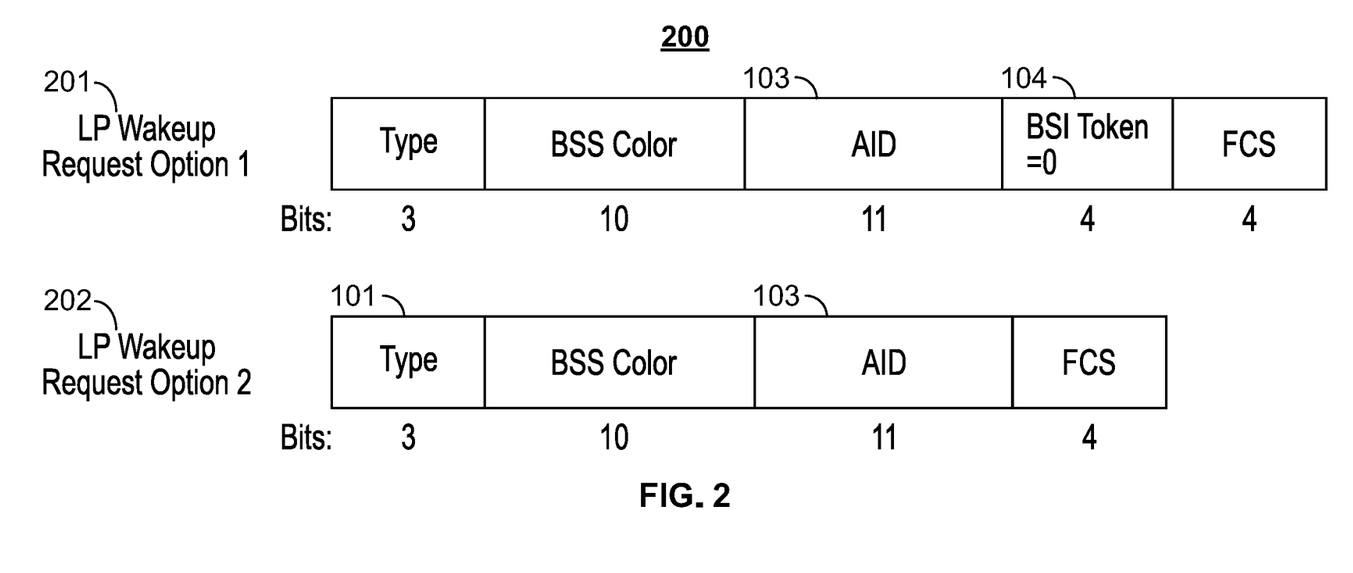
FIG. 2 is a block diagram illustrating alternative configurations of the WUR frame shown in FIG. 1 depending on whether new BSS operation information is included in the WUR frame, according to some embodiments described herein.

FIG. 2 is a block diagram 200 illustrating alternative configurations of the WUR frame shown in FIG. 1 depending on whether new BSS operation information is included in the WUR frame, according to some embodiments described herein. When the AP determines that a management frame to be transmitted includes no new BSS operation information and is not a public action frame, the AP may not need to use a WUR frame to wake up the intended low power device.

In some embodiments, no low power WUR frame is transmitted from the AP to the low power device to announce the transmission of the management frame when the management frame contains no new BSS operation information. Correspondingly, a low power device that wants to associate with the AP may need to perform normal operation to receive the management frame, e.g., via passive scanning or active scanning of the channel with the AP to detect whether a management frame is being transmitted.

In some embodiments, the AP may transmit a low power WUR frame to announce the transmission of the management frame even if the management frame includes no new BSS operation information. In this case, a low power device who wants to associate with the AP does not need to perform normal operation such as passive scanning or active scanning to receive the management frame. When a low power WUR frame is used to announce the transmission of the management frame whose content includes new BSS operation information, a new type is defined for such announcement, and the AP configures the WUR frame 100 with the new type in the type field 101.

In order for all intended low power devices to receive the updated BSS operation parameters from the AP, a management frame with the same BSS operation updates may be transmitted (and re-transmitted) multiple times. Upon receiving multiple copies of the management frame, the low power device may only need to decode one copy of the management frame. In some embodiments, as shown at the WUR frame described at 201, a specific dialog token value configured at the BSI token field 104, e.g. 0, may be used to indicate that the AP has started or recovered a BSS. The BSI token filed 104 may include a dialog token value starting from 0, and each time the BSS operation parameters change, the Dialog Token value in the BSI token field 104 is increased by 1. If the Dialog Token value reaches 16, the Dialog Token value is reset to becomes 0 to restart the count.

In some embodiments, each time when a low power device receives a WUR frame that announces the management frames which carry the updated BSS operation parameters, and when the low power device correctly receives the corresponding management frame transmitted subsequent to the WUR frame, the low power device may record the dialog token value from the BSI token field 104 of the WUR frame 201. If the low power device receives a WUR frame with the same token value as the record kept with the low power device, the low power device may ignore the WUR frame without waking up the WLAN receiver to receive the subsequent management frame, because the WUR frame indicates that the BSS parameters with the low power device is the latest version. If the low power device receives a WUR frame having a token value different the token record kept at the low power device, the low power device may wake up the WLAN receiver to receive and decode the subsequent management frame.

In some embodiments, as shown at the WUR frame described at 202, instead of using the BSI token field 104, a specific type value can be configured with the type field 101 to indicate that the AP has started or recovered a BSS. In this case, the WUR frame 202 may not need the BSI token field 104.

In some embodiments, the AP that starts a BSS or recovers a BSS may transmits beacon frames including the BSS information, and the beacon frames can be announced by WUR frames multiple times. For example, the AP may configure WUR frame 201 to include a BSS operation token starting from 0, as described above. Or alternatively, the AP may configure WUR frame 202 to include a specific type value 101 to indicate a beacon frame is transmitted subsequently.

For WUR frame 201, in which the BSI token (104) value starts from a value of 0 value when the AP starts a BSS, or in WUR frame 202, in which the specific type value is configured with field 101 to indicate the start of a BSS, the AID field 103 includes an 11-bit medium access control (MAC) address, or the partial MAC address of the AP. The 11-bit MAC address (or partial MAC address) may be used for low power devices to identify the AP when the AP is recovered, e.g., when the connection with AP is interrupted and then recovered, as after the recovery, the AP may select a new BSS color/identifier in the WUR frame.

For example, when a lower power device loses connection with an associated AP, e.g., due to a connection error, channel interruption, etc., the lower power device may receive, when the AP is recovered, a WUR frame (e.g., either 201 or 202) that announces the BSS starting. The low power device may then need to determine whether the newly connected AP from which the WUR frame is received is the associated AP. The low power device may extract the 11-bit value from the AID field 103, and compare the AID value with a previously stored MAC address of the AP. In response to determining that the AID value 103 matches with the previously stored MAC address of the AP, the low power device may receive the beacon frame that is transmitted subsequent to the WUR frame. If the low power device determines that the subsequently received beacon frame is from the associated AP (e.g., the AID match with previously stored MAC address of the AP), e.g., the associated AP recovers from an error, the lower power device may re-associate with the AP. Alternatively, if the low power device determines that the subsequently received beacon frame is not from the associated AP, the low power device may discard the beacon frame. Or alternatively, if the low power device is not previously associated with any AP, e.g., when the low power device just joins a WLAN, but wants to establish a BSS, the low power device may receive and decode the beacon frame to obtain BSS information.

In some embodiments, the starting or recovering of BSS between an AP and a low power device may be implemented through WUR frames similar to WUR frames 201-202 but without the AID field 103. For example, if the broadcast WUR frame having a BSI token value of 0 or a special type value indicating starting a BSS, the AID field 103 may not be needed. In this case, if a low power device is associated with an AP and receives a WUR frame that announces a BSS starting, the lower power device may receive and decode a subsequently received beacon frame to obtain BSS information. If the subsequently received beacon frame is from an associated AP with the low power device, e.g., when the associated AP recovers from an error, the low power device may re-associate with the AP. If the subsequently received beacon frame is not from the associated AP, the low power device may discard the beacon frame. If a low power device that is not previously associated with any AP, e.g., when the low power device just joins a WLAN, but wants to establish a BSS, the low power device may receive and decode the beacon frame to obtain BSS information.

Figure 3:
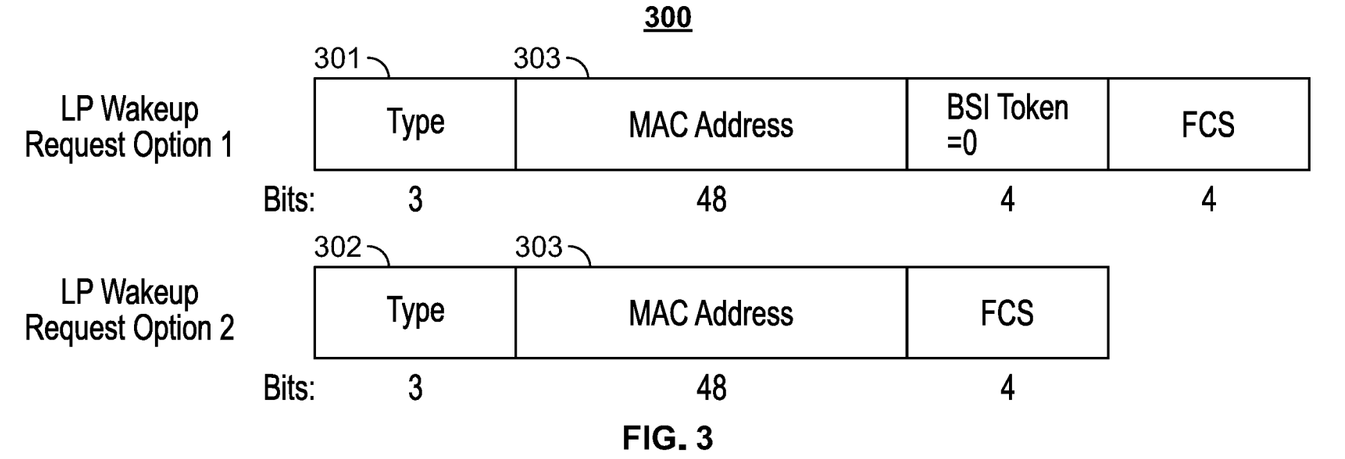
FIG. 3 is a block diagram illustrating alternative configurations of the WUR frame shown in FIG. 1 using a full MAC address to start or recover a BSS, according to embodiments described herein.

FIG. 3 is a block diagram 300 illustrating alternative configurations of the WUR frame shown in FIG. 1 using a full MAC address to start or recover a BSS, according to embodiments described herein. As described in relation to FIG. 2, an AP may start a BSS (may also recover a BSS) by transmitting beacon frames which are announced by WUR frames 201 or 202. The AP may use WUR frame 201 that includes a BSI token value 104 for a low power device to determine whether the BSS version at the low power device is the latest and whether an update is needed. Or the AP may use WUR frame 202 that encodes a specific field type 101 to indicate a BSS start or recovery. Similar configurations of the BSI token filed and the type filed may be used for WUR frames 301 and 302, respectively. In WUR frames 301 and 302, however, no AID filed is used. Instead, the MAC Address of the AP that start the BSS is configured in a 48-bit MAC address field 303.

For example, when a low power device associated with an AP receives a WUR frame 301 or 302 from the associated AP that announces the BSS starting or recovery, after a disconnection with the AP, the low power device may parse the MAC address 303 from the WUR frame 301 or 302 to determine whether the WUR frame 301 or 302 is sent from the AP that the low power device is associated with. The low power device may then wake up the WLAN receiver to receive and decode a subsequent beacon frame, and may re-associate with the AP. Otherwise, if a WUR frame 301 or 302 is received but not from the associated AP based on the MAC address 303, the low power device may not wake up the WLAN receiver to receive and decode the beacon frame. If a low power device which is not associated with any AP but wants to join a BSS, the low power device may wake up the WLAN receiver to receive and decode the subsequent beacon frame.

Figure 4:
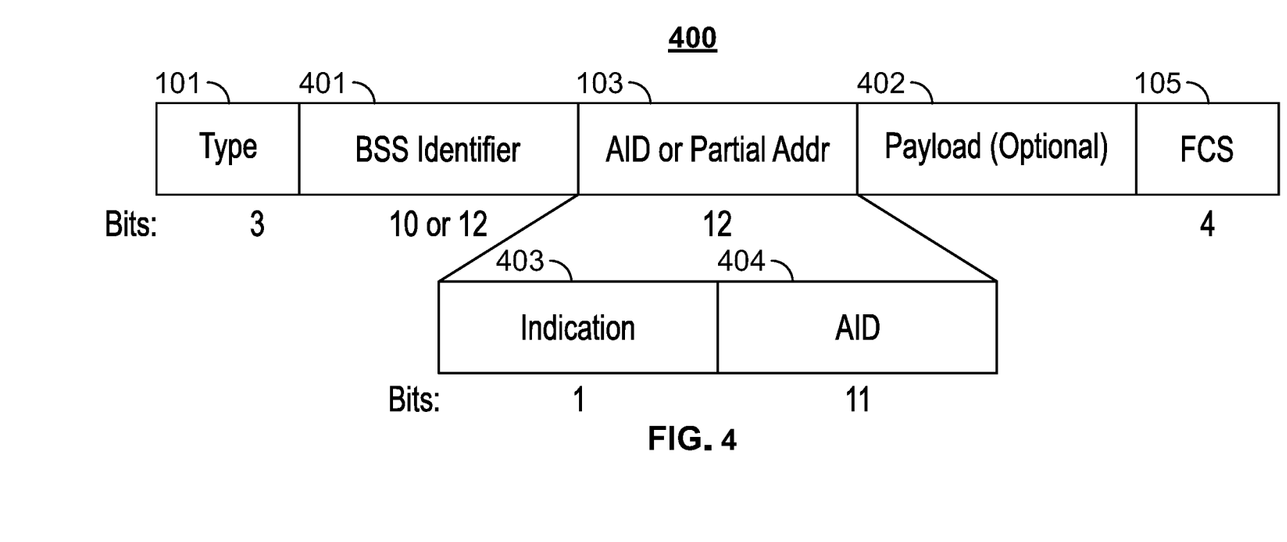
FIG. 4 provides a block diagram illustrating an alternative configuration of the WUR frame shown in FIG. 1 to announce a public action frame, according to embodiments described herein.

FIG. 4 provides a block diagram 400 illustrating an alternative configuration of the WUR frame shown in FIG. 1 to announce a public action frame or for other purpose, according to embodiments described herein. The WUR frame shown at 400 includes a type field 101, a BSS identifier field 401, a station identifier (e.g., AID) or partial MAC address field 103, optional payload 402 and the FCS field 105. In some embodiments, a low power device may need to receive a broadcast public action frame from the AP. For example, when an extended service set (ESS) including a set of interconnected BSSs and their associated WLANs that only have low power devices, each AP within the ESS needs to transmit a public action frame when the respective AP needs to communicate with a respective low power device. In this case, a specific BSS identifier, e.g. an all "1" BSS identifier or an all "0" BSS identifier, may be configured in the BSS identifier field 401 in the WUR frame to announce a broadcast public action frame. For example, when a low power device receives a WUR frame with the specific BSS identifier indicating that a public action frame is to be transmitted subsequently, the low power device may wake up the WLAN receiver and receive the following public action frame.

In some embodiments, a unicast public action frame may be transmitted from the AP to a low power device, and the unicast public action frame usually has a unique destination, e.g., the intended low power device. When the transmitter (e.g., the AP) and the receiver (e.g., an intended low power device) of the unicast public action frame are not in same BSS, the transmitter may not know the AID of the receiver, and thus may not be able to provide an identifying route to send the public action frame to the intended device. In this case, the transmitter may send the WUR frame 400 to define the AID field 103 with a specific value, e.g. related to the receiver's partial MAC address. For example, the AID or the partial address field 103 in the WUR frame 400 may be defined by the type field 101, or other field such as a token field (not shown in FIG. 4) indicating whether the AID or partial address field 103 carries an 11-bit AID or an 11-bit partial MAC address. For another example, one bit of the AID or partial address field 103, e.g. the partial address indication subfield 403, is set to 1 to indicate that the AID subfield 404 includes an 11-bit partial address of the receiver's MAC address. Or, the partial address indication subfield 403 is set to 0 to indicate that the AID subfield 404 includes the 11-bit least significant bits (LSBs) of the AID of the receiver. With the configuration of the AID field 103, if the WUR frame 400 announces a unicast public action, the partial MAC address field 103 may indicate the partial MAC address of the receiver. Alternatively, if the WUR frame 400 announces a BSS starting, the AID or partial MAC address field 103 indicate the partial MAC address of an AP associated with the BSS.

Figure 5:
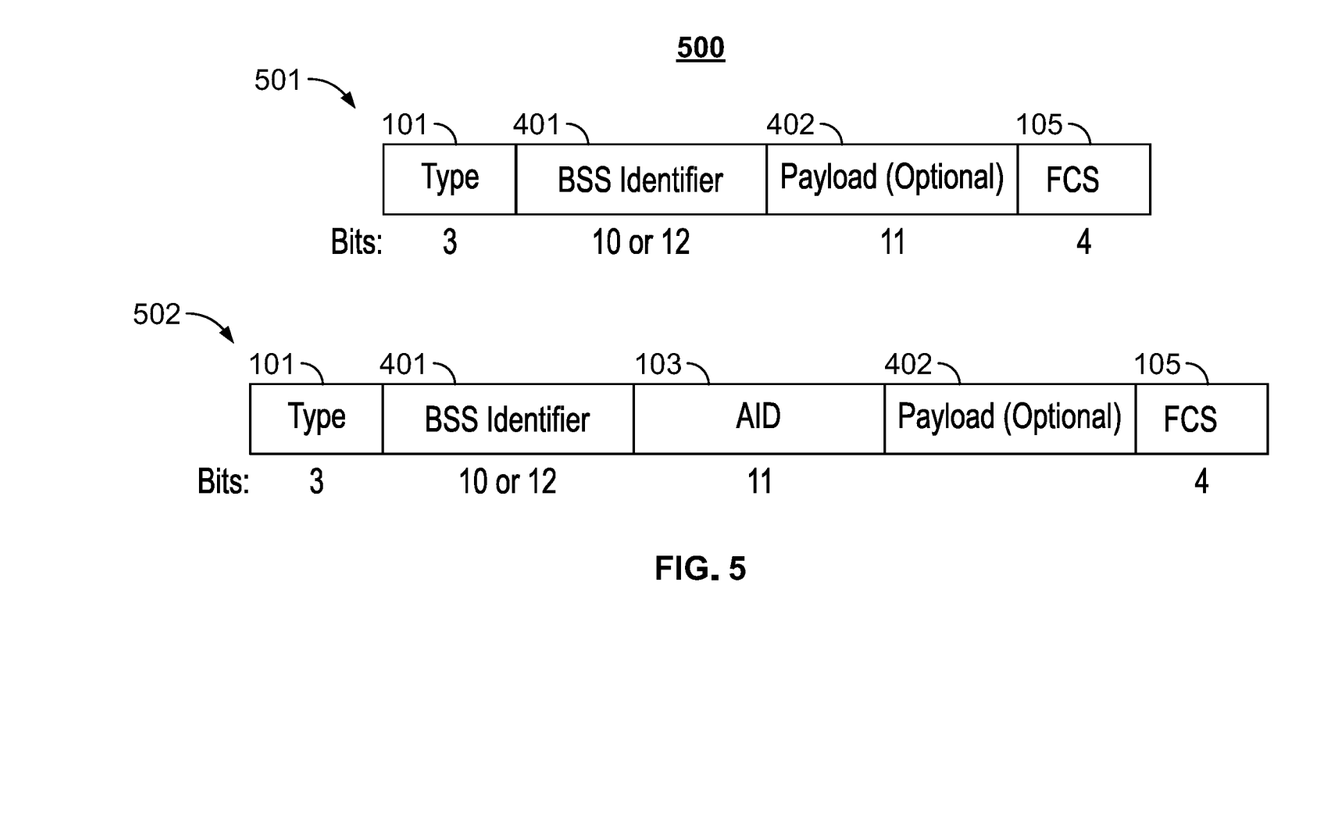
FIG. 5 provides a block diagram illustrating alternative configurations of the WUR frame shown in FIG. 1 for broadcast announcement, according to embodiments described herein.

FIG. 5 provides a block diagram 500 illustrating alternative configurations of the WUR frame shown in FIG. 1 for broadcast announcement, according to embodiments described herein. WUR frame 501 includes a type filed 101, a BSS identifier 401, optional payload data 402 and the FCS field 105, and WUR frame 502 includes the same fields with WUR frame 501 but with an additional AID filed 103. The AID field 103 may not be needed if each VAP (virtual AP) in the BSS has its own BSS identifier, and a low power device that receives the WUR frame 501 would be able to determine the VAP based on the BSS identifier 401 even without the AID (partial MAC address) of the AP. In this case, when a low power device receives the WUR frame 501 and determines that the BSS identifier from the BSS Identifier field 401 corresponds to a VAP that the low power device is associated with, all low power devices associated with the VAP may wake up to receive a subsequent broadcast frame. In this way, a VAP may announce the transmitted BSS Identifier in a Beacon, a Probe Response, a (Re-) Association Response, and/or the like.

In some embodiments, as shown in WUR frame 502, an AID field 103 is needed if all VAPs of an AP device have same BSS identifier, yielding the VAPs unable to distinguish from one another solely based on the BSS identifier. The AID field 103 may be configured with a specific value, e.g. the value of "2047" indicates the announcement of a broadcast frame for low power devices associated with multiple VAPs. For another example, AIDs with values between 0 and $2^n-1$ (n is the value of the maximum BSS identifier, which may be configured in the Max BSSID Indicator subfield in the BSS identifier field 401) announce broadcast frames for low power devices associated with a respective VAP having the respective AID.

Figure 6:
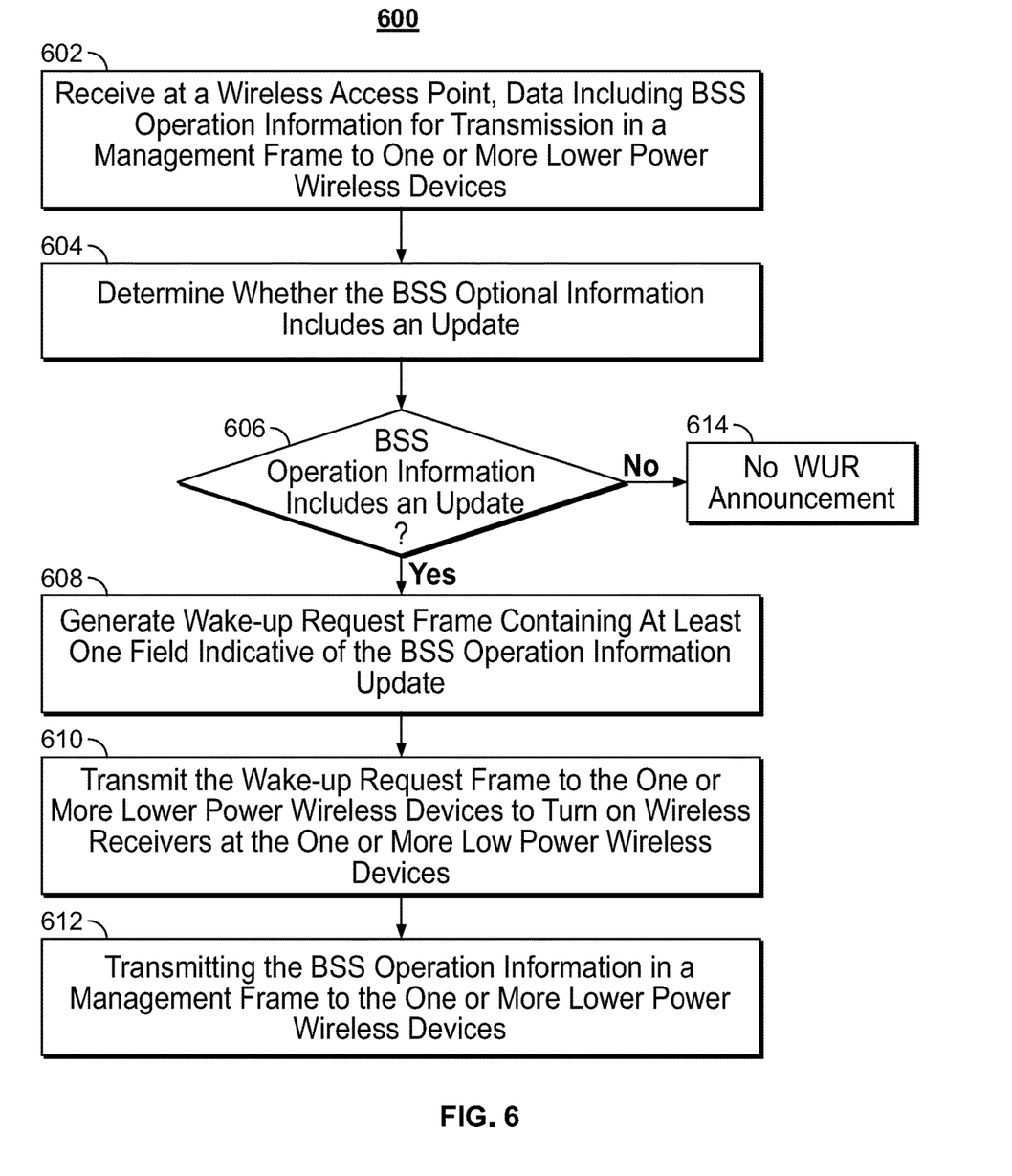
FIG. 6 shows an example logic diagram illustrating a wireless access point configuring and transmitting a WUR frame (similar to those described in FIGS. 1-5) to announce a management frame, according to embodiments described herein.

FIG. 6 shows an example logic diagram 600 illustrating a wireless access point configuring and transmitting a WUR frame (similar to those described in FIGS. 1-5) to announce a management frame, according to embodiments described herein. At 602, a wireless AP is configured to receive data including BSS operation information for transmission in a management frame to one or more lower power wireless devices. At 604, the wireless AP is configured to determine whether the BSS operation information includes an update. In response to determining that the BSS operation information includes an update at 606, the wireless AP is configured to generate a wake-up request frame containing at least one field indicative of the BSS operation information update at 608, and transmit the wake-up request frame to the one or more lower power wireless devices to turn on wireless receivers at the one or more low power wireless devices at 610, prior to transmitting the BSS operation information in a management frame to the one or more lower power wireless devices at 612. Or alternatively, in response to determining that the BSS operation information includes no update at 606, the wireless AP is configured not to generate any wake-up announcement at 614.

Figure 7:
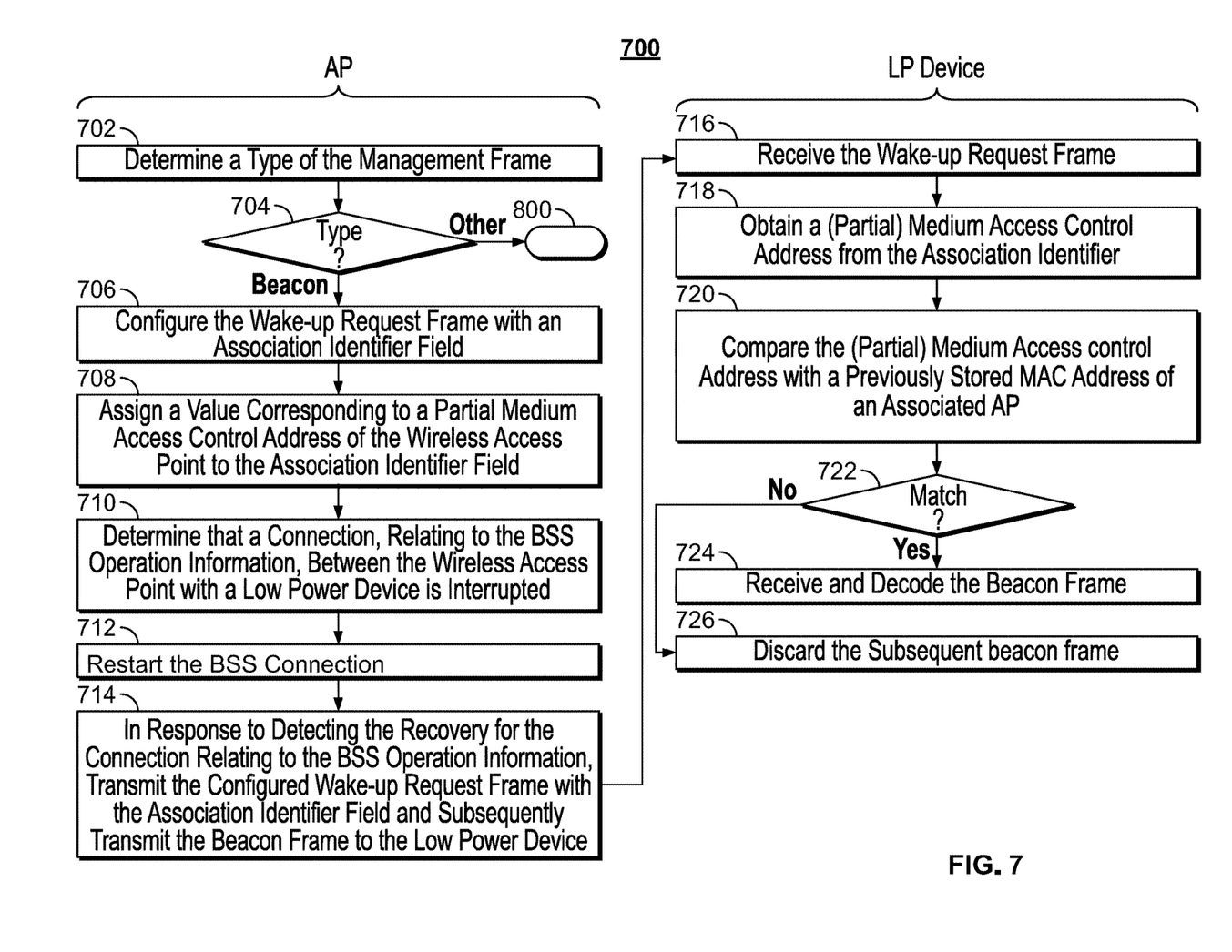
FIGS. 7-9 example logic diagrams illustrating interaction between a wireless access point and a low power device to transmit and receive a WUR frame based on different types of a management frame to be announced (similar to those described in FIGS. 2-5), according to embodiments described herein.

FIG. 7 shows an example logic diagram 700 illustrating an interactive work flow between a wireless AP and a low power device to announce a beacon frame, according to embodiments described herein. At 702, the wireless AP determines a type of the management frame to be transmitted. At 704, when the type of the management frame is a beacon frame, the wireless AP continues to configure a WUR frame with an association identifier field (e.g., 103 in FIGS. 2-3) at 706. At 708, the wireless AP assigns a value corresponding to a partial MAC address of the AP to the association identifier field. At 710, the wireless AP determines that a connection, relating to the BSS operation information, between the AP and a low power device is interrupted. At 712, the wireless AP may recover the connection between the AP and the low power device to restart the BSS. At 714, in response to detecting the recovery for the connection relating to the BSS operation information, the wireless AP transmits the WUR frame with AID and subsequently transmit the beacon frame to the low power device.

At the low power device, upon receiving the WUR frame at 716, the low power device obtains a partial MAC address from the AID field at 718. At 720, the low power device compares the partial MAC address with a previously stored MAC address of an associated AP with the low power device. At 722, if a match is identified between the partial MAC address with a previously stored MAC address of an associated AP, the low power device receives and decodes the beacon frame at 724. Otherwise, if no match is found, the low power device may discard the beacon frame, and may not even wake up the 802.11 receiver.

Figure 8:
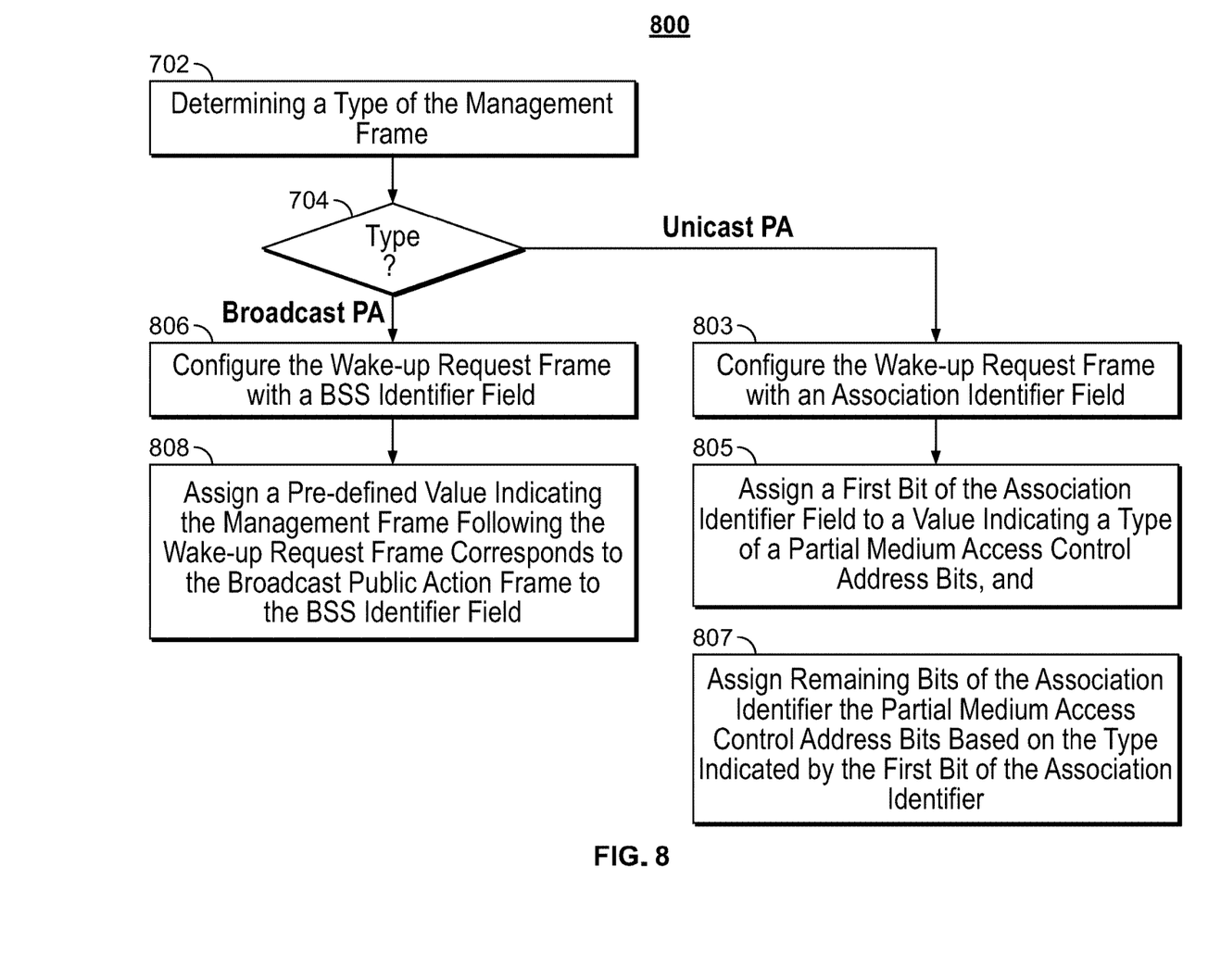

Back at 704, when the management frame is not a beacon frame, but instead, is broadcast public action frame, as shown in FIG. 8, the wireless AP configures the WUR frame with a BSS identifier field (e.g., see 401 in FIG. 5) at 806. At 808, the wireless AP assigns a pre-defined value indicating the management frame following the WUR frame corresponds to the broadcast public action frame, to the BSS identifier field.

Back to 704, when the management frame is a unicast public action frame, the wireless AP configures the WUR frame with an AID (e.g., see 103 in FIG. 4) field. At 805, the wireless AP assigns a first bit (e.g., 403 in FIG. 4) of the AID field to a value indicating a type of a partial MAC address bits. At 807, the wireless AP assigns remaining bits of the AID (e.g., 404 in FIG. 4) the partial MAC address bits based on the type indicated by the first bit of the AID.

Figure 9:
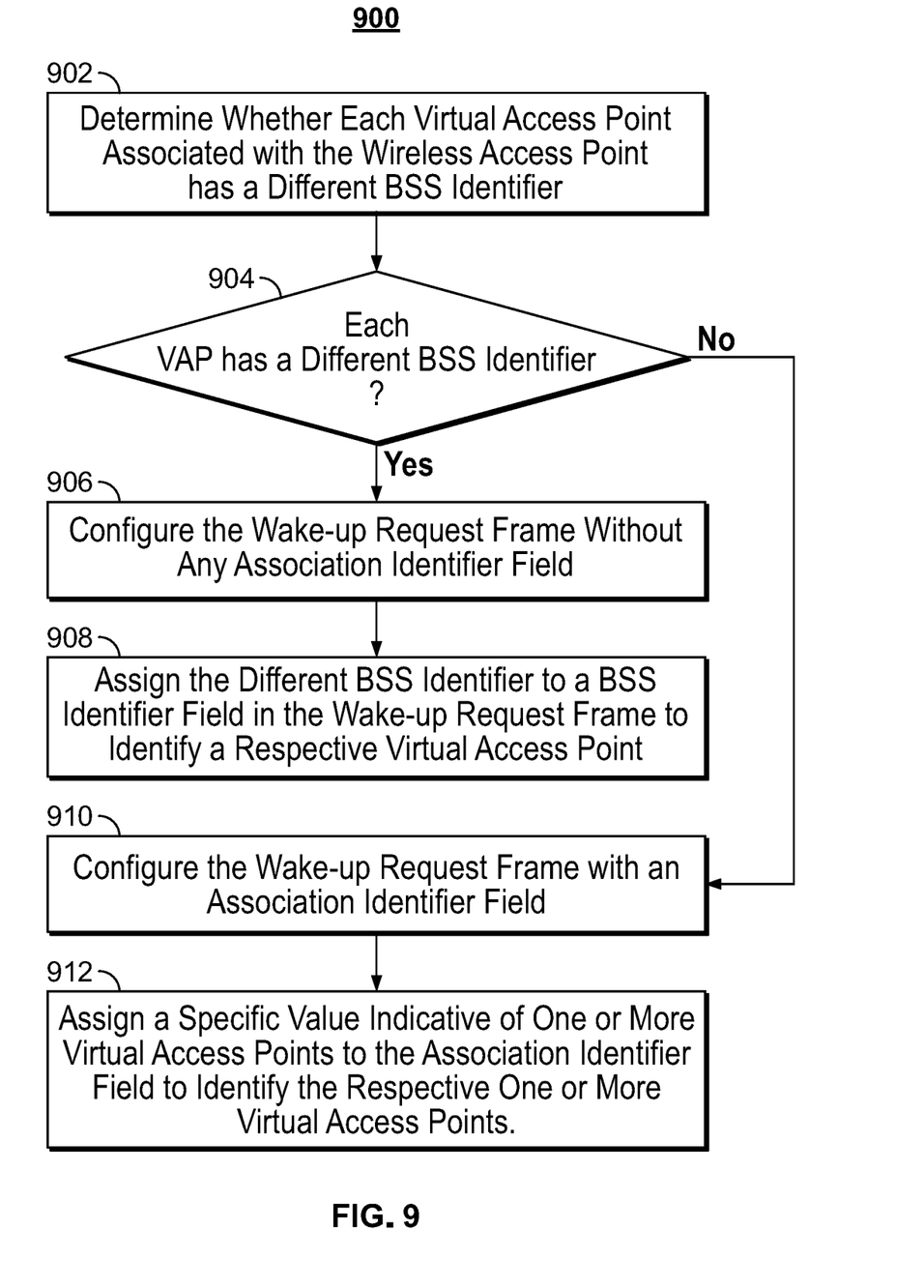

FIG. 9 provides a logic flow diagram 900 illustrating aspects of configuring a WUR frame for multiple virtual APs associated with a wireless AP, according to embodiments described herein. At 902, the wireless AP determines whether each virtual access point associated with the wireless access point has a different BSS identifier. In response to determining that each virtual access point associated with the wireless AP has a different BSS identifier at 904, the wireless AP configures the WUR frame without any AID field at 906, and assign the different BSS identifier to a BSS identifier field in the WUR frame to identify a respective virtual access point at 908. In response to determining that not all virtual APs associated with the wireless AP have different BSS identifiers at 904, the wireless AP configures the wake-up request frame with an association identifier field at 910. At 912, the wireless AP assigns a specific value indicative of one or more virtual APs to the association identifier field to identify the respective one or more virtual APs.

Various embodiments discussed in conjunction with FIGS. 1-9 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., wireless AP, LP devices discussed in relation to FIGS. 1-9), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIGS. 6-9 does not necessarily require the particular order shown, or sequential order, to achieve desirable results. In certain implementations, multitasking and parallel processing may be advantageous. Other variations are within the scope of the following claims.

What is claimed is:

1. A method for transmitting a wake-up request frame to low power devices to announce a management frame of basic service set (BSS) information in a wireless local area network, the method comprising:
   receiving, at a wireless access point, data including BSS operation information for transmission in a management frame to one or more lower power wireless devices;
   determining whether the BSS operation information includes an update;
   in response to determining that the BSS operation information includes an update:
      generating a wake-up request frame containing at least one field indicative of the BSS operation information update based on a type of the management frame, and
      transmitting the wake-up request frame to the one or more lower power wireless devices to turn on respective one or more wireless receivers at the one or more low power wireless devices prior to transmitting the BSS operation information in a management frame to the one or more lower power wireless devices.

2. The method of claim 1, wherein the generating the wake-up request frame containing at least one field indicative of the BSS operation information update comprises:
   configuring a BSS operation information token field within the wake-up request frame;
   assigning a token value of zero to the BSS operation information token field when a new BSS is formed; and
   assigning a token value corresponding to a previously used token value incremented by one to the BSS operation information token field when the BSS operation information is to update an existing BSS.

3. The method of claim 1, wherein the generating the wake-up request frame containing at least one field indicative of the BSS operation information update comprises:
   configuring a type field within the wake-up request frame; and
   assigning a type value defined to indicate a BSS start or a BSS recovery to the type field.

4. The method of claim 1, further comprising:
   determining whether a type of the management frame corresponds to a beacon frame;
   in response to determining that the management frame corresponds to the type of the beacon frame:
      configuring the wake-up request frame with an association identifier field; and
      assigning a value corresponding to a partial medium access control address of the wireless access point to the association identifier field.

5. The method of claim 4, further comprising:
   determining that a connection, relating to the BSS operation information, between the wireless access point with a low power device is interrupted;
   monitoring a condition for the connection for a recovery;
   in response to detecting the recovery for the connection relating to the BSS operation information, transmitting the configured wake-up request frame with the association identifier field and subsequently transmit the beacon frame to the low power device,
      wherein the low power device determines whether to receive and decode the beacon frame based on comparing the association identifier field with a previously stored medium access control address of an associated access point.

6. The method of claim 5, wherein the low power device is configured to receive and decode the beacon frame when the low power device is not previously associated with any wireless access point.

7. The method of claim 4, further comprising:
   in response to determining that the management frame corresponds to the type of the beacon frame:
      configuring the wake-up request frame with a medium access control address field;
      assigning a value corresponding to a full medium access control address of the wireless access point to the medium access control address field.

8. The method of claim 1, further comprising:
   determining whether the management frame corresponds to a type of a broadcast public action frame;
   in response to determining that the management frame corresponds to the type of the broadcast public action frame, configuring the wake-up request frame with a BSS identifier field; and
      assigning a pre-defined value indicating the management frame following the wake-up request frame corresponds to the broadcast public action frame to the BSS identifier field.

9. The method of claim 8, further comprising:
   determining whether the management frame corresponds to a type of a unicast public action frame;
   in response to determining that the management frame corresponds to the type of the unicast public action frame, configuring the wake-up request frame with an association identifier field;
      assigning a first bit of the association identifier field to a value indicating a type of a partial medium access control address bits, and
      assigning remaining bits of the association identifier the partial medium access control address bits based on the type indicated by the first bit of the association identifier.

10. The method of claim 1, further comprising:
    determining whether the management frame corresponds to a type of a broadcast frame;
    in response to determining that the management frame corresponds to the type of the broadcast frame:
       determining whether each virtual access point associated with the wireless access point has a different BSS identifier;
       in response to determining that each virtual access point associated with the wireless access point has a different BSS identifier:
          configuring the wake-up request frame without any association identifier field, and assigning the different BSS identifier to a BSS identifier field in the wake-up request frame to identify a respective virtual access point;

in response to determining that not all virtual access points associated with the wireless access point have different BSS identifiers:

configuring the wake-up request frame with an association identifier field, and assigning a specific value indicative of one or more virtual access points to the association identifier field to identify the respective one or more virtual access points.

11. A network device for transmitting a wake-up request frame to low power devices to announce a management frame of basic service set (BSS) information in a wireless local area network, the network device comprising:

a buffer configured to receive data including BSS operation information for transmission in a management frame to one or more lower power wireless devices;

control circuitry configured to:

determine whether the BSS operation information includes an update;

in response to determining that the BSS operation information includes an update:

generate a wake-up request frame containing at least one field indicative of the BSS operation information update based on a type of the management frame, and a wireless transmitter configured to transmit the wake-up request frame to the one or more lower power wireless devices to turn on respective one or more wireless receivers at the one or more low power wireless devices prior to transmitting the BSS operation information in a management frame to the one or more lower power wireless devices.

12. The network device of claim 11, wherein the control circuitry is further configured, when generating the wake-up request frame containing at least one field indicative of the BSS operation information update, to:

configure a BSS operation information token field within the wake-up request frame;

assign a token value of zero to the BSS operation information token field when a new BSS is formed; and assign a token value corresponding to a previously used token value incremented by one to the BSS operation information token field when the BSS operation information is to update an existing BSS.

13. The network device of claim 11, wherein the control circuitry is further configured, when generating the wake-up request frame containing at least one field indicative of the BSS operation information update, to:

configure a type field within the wake-up request frame; and assign a type value defined to indicate a BSS start or a BSS recovery to the type field.

14. The network device of claim 11, wherein the control circuitry is further configured to:

determine whether a type of the management frame corresponds to a beacon frame;

in response to determining that the management frame corresponds to the type of the beacon frame:

configure the wake-up request frame with an association identifier field;

assign a value corresponding to a partial medium access control address of the wireless access point to the association identifier field.

15. The network device of claim 14, wherein the control circuitry is further configured to:

determine that a connection, relating to the BSS operation information, between the wireless access point with a low power device is interrupted;

monitor a condition for the connection for a recovery;

in response to detecting the recovery for the connection relating to the BSS operation information, transmit the configured wake-up request frame with the association identifier field and subsequently transmit the beacon frame to the low power device, wherein the low power device determines whether to receive and decode the beacon frame based on comparing the association identifier field with a previously stored medium access control address of an associated access point.

16. The network device of claim 15, wherein the low power device is configured to receive and decode the beacon frame when the low power device is not previously associated with any wireless access point.

17. The network device of claim 14, wherein the control circuitry is further configured to:

in response to determining that the management frame corresponds to the type of the beacon frame:

configure the wake-up request frame with a medium access control address field;

assign a value corresponding to a full medium access control address of the wireless access point to the medium access control address field.

18. The network device of claim 11, wherein the control circuitry is further configured to:

determine whether the management frame corresponds to a type of a broadcast public action frame;

in response to determining that the management frame corresponds to the type of the broadcast public action frame, configure the wake-up request frame with a BSS identifier field; and assign a pre-defined value indicating the management frame following the wake-up request frame corresponds to the broadcast public action frame to the BSS identifier field.

19. The network device of claim 18, wherein the control circuitry is further configured to:

determine whether the management frame corresponds to a type of a unicast public action frame;

in response to determining that the management frame corresponds to the type of the unicast public action frame, configure the wake-up request frame with an association identifier field;

assign a first bit of the association identifier field to a value indicating a type of a partial medium access control address bits, and assign remaining bits of the association identifier the partial medium access control address bits based on the type indicated by the first bit of the association identifier.

20. The network device of claim 11, wherein the control circuitry is further configured to:

determine whether the management frame corresponds to a type of a broadcast frame;

in response to determining that the management frame corresponds to the type of the broadcast frame:

determine whether each virtual access point associated with the wireless access point has a different BSS identifier;

in response to determining that each virtual access point associated with the wireless access point has a different BSS identifier:
configure the wake-up request frame without any association identifier field, and
assign the different BSS identifier to a BSS identifier field in the wake-up request frame to identify a respective virtual access point;

in response to determining that not all virtual access points associated with the wireless access point have different BSS identifiers:
configure the wake-up request frame with an association identifier field, and
assign a specific value indicative of one or more virtual access points to the association identifier field to identify the respective one or more virtual access points.

* * * * *